(12) United States Patent
Rausch et al.

(10) Patent No.: US 9,039,904 B2
(45) Date of Patent: May 26, 2015

(54) METHOD FOR TREATING WASTEWATERS

(75) Inventors: Andreas Karl Rausch, Neuss (DE);
Christoph Blöcher, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 540 days.

(21) Appl. No.: 13/147,627

(22) PCT Filed: Jan. 27, 2010

(86) PCT No.: PCT/EP2010/000463
§ 371 (c)(1),
(2), (4) Date: Sep. 6, 2011

(87) PCT Pub. No.: WO2010/089043
PCT Pub. Date: Aug. 12, 2010

(65) Prior Publication Data
US 2011/0309033 A1 Dec. 22, 2011

(30) Foreign Application Priority Data
Feb. 6, 2009 (DE) .......................... 10 2009 007 761

(51) Int. Cl.
| | | |
|---|---|---|
| *C02F 1/28* | (2006.01) | |
| *C02F 1/66* | (2006.01) | |
| *C02F 1/70* | (2006.01) | |
| *C02F 1/72* | (2006.01) | |
| *C02F 9/00* | (2006.01) | |
| *C02F 11/08* | (2006.01) | |
| C02F 101/00 | (2006.01) | |
| C02F 101/38 | (2006.01) | |

(52) U.S. Cl.
CPC .............. *C02F 1/727* (2013.01); *C02F 1/283* (2013.01); *C02F 1/286* (2013.01); *C02F 1/66* (2013.01); *C02F 1/70* (2013.01); *C02F 9/00* (2013.01); *C02F 11/08* (2013.01); *C02F 2101/003* (2013.01); *C02F 2101/38* (2013.01)

(58) Field of Classification Search
CPC .............. C02F 1/70; C02F 9/00; C02F 1/283; C02F 1/286; C02F 1/66; C02F 1/727; C02F 2101/003; C02F 2101/32; C02F 2101/322; C02F 2101/38; C02F 11/08
See application file for complete search history.

(56) References Cited

U.S. PATENT DOCUMENTS

| | | | |
|---|---|---|---|
| 4,230,567 A | 10/1980 | Larbig | |
| 4,321,143 A | 3/1982 | Wilms et al. | |
| 4,525,283 A | 6/1985 | Horak et al. | |
| 5,232,605 A | 8/1993 | Baur et al. | |
| 5,711,020 A | 1/1998 | Wolfe et al. | |
| 6,100,382 A * | 8/2000 | Wolfe et al. | 530/370 |
| 2005/0224424 A1* | 10/2005 | Knauf et al. | 210/766 |
| 2006/0016762 A1* | 1/2006 | Cha et al. | 210/739 |

FOREIGN PATENT DOCUMENTS

| | | |
|---|---|---|
| EP | 0360989 A1 | 4/1990 |
| EP | 1132347 B1 | 9/2005 |
| JP | 50019258 | 2/1975 |

OTHER PUBLICATIONS

Chamarro, E. et al., Use of Fenton Reagent to Improve Organic Chemical Biodegradability, Water Research, 2001, vol. 35, No. 4, pp. 1047-1051, Elsevier Science Ltd., Great Britain.

* cited by examiner

*Primary Examiner* — Lucas Stelling
(74) *Attorney, Agent, or Firm* — Donald R. Palladino; Robert S. Klemz; Lyndanne M. Whalen

(57) ABSTRACT

The invention relates to a method for treating wastewater containing nitroaromatics and nitrohydroxyaromatics, as for example arises in the production of nitroaromatics or in the production of nitrohydroxyaromatics, by a two-stage method consisting of pre-reduction and wet oxidation.

6 Claims, No Drawings

METHOD FOR TREATING WASTEWATERS

The invention relates to a method for treating wastewater containing nitroaromatics and nitrohydroxyaromatics, as for example arises in the production of nitroaromatics or in the production of nitrohydroxyaromatics.

Nitroaromatics and nitrohydroxyaromatics have a bactericidal action and/or are poorly biodegradable. They must therefore not be released into the environment and must also not be introduced in elevated concentrations into biological effluent treatment plants. As a consequence, such wastewater must be subjected to a processing engineering treatment so that it can be discharged to a biological effluent treatment plant.

The prior art discloses a plurality of process engineering solutions for degrading nitroaromatics and nitrohydroxyaromatics in aqueous solutions, but all of them are associated with significant disadvantages.

DE 2818680 A1 claims a method for treating wastewater containing nitrohydroxyaromatics, characterised in that the wastewater containing nitrohydroxyaromatics is heated under pressure to temperatures in the range from 150° C. to 500° C. with exclusion of air and oxygen. 50 to 350 bar is stated as a preferred pressure range. In this method, it is advantageous for the wastewater to contain the nitrohydroxyaromatics in the form of the water-soluble salts thereof, which can be formed in an alkaline environment. The drawback of this method is the high pressure which is required, which, when said method is performed continuously, entails elevated costs for the provision and operation of suitable pumps. Permanent heating is also necessary to maintain the. required temperature. A further disadvantage of this methods that the content of nitrite ions in the wastewater is not reduced by the method, but instead, as. may be. inferred from the Examples of DE 2818680 A1, at least remains constant (Example 4), but may also double (Example 2). Nitrite ions are likewise bactericidal and can only be accepted to a limited extent by biological effluent treatment plants.

EP 503387 B1 claims a method for treating wastewater containing aromatic nitro compounds from nitrobenzene production plants by treatment with nitric acid at temperatures of 180 to 350° C. and pressures of 40 to 250 bar. Such treatment reduces the content of nitrohydroxyaromatics to values of below 1 ppm while simultaneously achieving TOC (Total Organic Carbon) degradation of more than 95%.

Drawbacks of this method are the necessary operating conditions, and the use of nitric acid, which increases the nitrate load in the wastewater.

BP 1132347 B1 claims a method in which wastewater from nitroaromatic synthesis is firstly concentrated to close to or above the solubility of the nitrohydroxyaromatics and then subjected to a thermal degradation treatment which is preferably performed under conditions which are supercritical for water. Operation of this method requires conditions which are above the critical pressure and critical temperature of water. The critical pressure of water is 218.3 bar and the critical temperature of water is 374.1° C. (Handbook of Chemistry and Physics, R. C. Weast (editor). CRC Press, Boca Raton, 66th Edition, 1985, Page F-64, table 2). Operating wastewater treatment facilities under such conditions entails high costs.

Any methods which use hydrogen peroxide as the oxidising agent are also associated with elevated costs. Divalent iron is here usually used as the catalyst under acidic conditions. This method is known as Fenton oxidation. The efficacy of this method in eliminating nitroaromatics has been demonstrated (for example E. Chamarro, A. Marco, S. Esplugas (2001): Use of Fenton reagent to improve organic chemical biodegradability. Water Research 35 (4), pages 1047-1051, or EP 22525 B1 or EP 360989 B1). In comparison with the above-stated methods, this method has the advantage that it can be operated without application of pressure and at ambient temperature. However, the oxidising agent hydrogen peroxide which is used generates high costs, which are higher, the higher is the content of nitroaromatics or nitrohydroxyaromatics in the wastewater. In addition, the method is characterised by elevated consumption of catalytically active iron, resulting in the formation of considerable quantities of sludge, the disposal of which generates additional costs. Methods which use hydrogen peroxide as the oxidising agent are therefore unsuitable for relatively severely contaminated wastewater, as arises for example in the production of nitroaromatics or in the production of nitrohydroxyaromatics.

DE 3316265 C2 claims a method for the wet oxidation of organic substances in contaminated wastewater by treatment with oxygen at elevated temperatures and pressures in the presence of a redox system, such as iron ions and with the simultaneous presence of co-catalysts such as benzoquinone, naphthoquinone or p-aminophenol. Wet oxidation is performed in an acidic environment at pH=1-4, temperatures of 50-200° C. and pressures of 1 to 60 bar.

Example 17 of this document describes that the co-catalysts required for oxidation may. also be obtained by alkaline treatment of lignite, providing that the lignite also remains in the reaction mixture during the oxidation step. Example 18 describes the identical procedure for hard coal.

This document moreover teaches adding a reducing agent, such as for example hydrazine, sulfur dioxide, sodium sulfide or iron chips, to wastewater which contains substances with an oxidising action, such as for example nitroaromatics, in order to convert the nitroaromatics which are mentioned by way of example into amines. This reduction must proceed in an upstream method step, as may inter alia be inferred from Example 16 of the document, in which sodium sulfide is used as the reducing agent. In said case, a wastewater, as arises during nitrostilbene acid synthesis, is adjusted with sodium hydroxide solution to pH=12, combined with 2 g/L of sodium sulfide and maintained at 140° C. in the absence of oxygen for 30 minutes. The wastewater is then oxidised at 180° C., an oxygen partial pressure of 5 bar, pH=2 and in the presence of iron(H) sulfate. Such treatment for 90 minutes reduced the DOG (Dissolved Organic Carbon) value by approx. 80%.

However, use of the reducing agents recommended in DE 3316265 C2 is disadvantageous, since they are costly (hydrazine, sulfides, sulfites) and/or contaminate the wastewater with an additional salt load (sulfates, metal ions). Nevertheless, this method docs have some merits over the prior art since it is capable of degrading organic compounds in wastewater at low pressures and temperatures.

The object of the invention was therefore to provide an operationally reliable, simple and inexpensive method for treating wastewater containing nitroaromatics and nitrohydroxyaromatics, which is distinguished by economically favourable operating conditions and which ensures that the treated wastewater can be discharged to a biological effluent treatment plant.

It has surprisingly been found that wastewater containing nitroaromatics and nitrohydroxyaromatics can be successfully treated for the purposes of the present invention if the method for treating this wastewater is performed in two stages and, in the first stage, the nitroaromatics and nitrohydroxyaromatics are reduced, i.e. hydrogenated, by an inexpensive, non-salt-forming reducing agent, and, in the second stage, the reaction mixture obtained from the first stage is subjected in an acidic environment to iron-catalysed wet oxidation with oxygen.

The invention relates to a method for treating wastewater containing nitroaromatics and/or nitrohydroxyaromatics, characterised in that, in a first stage, the wastewater is combined with an organic reducing agent, which is non-salt-forming in the wastewater, and is treated under, reducing conditions and the wastewater obtained from the first stage is then acidified in a second stage/and oxidised with an oxidising agent.

It has been found that iron-catalysed wet oxidation with oxygen in an alkaline environment alone is not sufficient for satisfactory degradation of nitrohydroxyaromatics (Comparative Example 1) and iron-catalysed wet oxidation with oxygen is out of the question in an acidic environment, since nitrohydroxyaromatics precipitate as solids under acidic conditions and the solids may be explosive (Comparative Example 2). Nitrohydroxyaromatics may successfully be completely eliminated by iron-catalysed wet oxidation with oxygen if, as described in DE 3316265 C2, the nitrohydroxyaromatics are chemically reduced, for example with sodium sulfite (Comparative Example 3).

In order to avoid using sodium sulfite, which is costly and generates a sulfate load, the use of less expensive auxiliary substances such as iron chips and lignite was investigated. Using iron chips, which are known as a reducing agent, pre-reduction decreases the content of nitrohydroxyaromatics by 64%. It has, however, surprisingly been found that lignite, in an alkaline environment may also be used as a reducing agent for reducing nitrohydroxyaromatics if pre-reduction is performed at elevated temperature, preferably at 120-200° C. The content of nitrohydroxyaromatics may be decreased by 86% with lignite (Comparative Example 4). If iron-catalysed wet oxidation with oxygen of wastewater containing nitrohydroxyaromatics is combined with pre-reduction of the wastewater with lignite in an alkaline environment, the nitrohydroxyaromatics may successfully be completely degraded (Example 5 according to the invention). Lignite is here distinguished by being an inexpensive reducing agent and makes no contribution to increasing the wastewater salt load, since it is itself biodegradable. The nitrogen present in the nitroaromatics or nitrohydroxyaromatics is here converted into compounds which are not harmful to bacteria, predominantly ammonium. Nitrite formation does not occur; quite the contrary, indeed, nitrite which is already present in the wastewater is likewise converted (Example 6 according to the invention).

A preferred method for treating wastewater containing nitroaromatics and/or nitrohydroxyaromatics is accordingly characterised in that, in a first stage, the wastewater is combined with peat, lignite and/or hard coal and treated under reducing conditions and, in a second stage, the wastewater obtained from the first stage is then acidified and oxidised with an oxidising agent.

Wastewater containing nitroaromatics and/or nitrohydroxyaromatics arises in the production of nitroaromatics, such as for example in the production of nitrobenzene by nitration of benzene or the production of dinitrotoluene by nitration of toluene. Such wastewater generally arises as alkaline solutions, since the nitrohydroxyaromatics dissolve in an aqueous medium in an alkaline environment in the form of the salts thereof. Such alkaline wastewater containing nitroaromatics and/or nitrohydroxyaromatics is combined with a reducing agent and preferably heated to temperatures of 80-200° C., particularly preferably of 120-200° C., and maintained in this temperature range for a residence time of between 5 min and 5 h, preferably from 15 min to 3 h. The temperature to which the wastewater is heated is preferably kept constant for the duration of the residence time. The reducing agent used according to the invention is a non-salt-forming reducing agent, preferably peat or a coal such as lignite or hard coal, particularly preferably ordinary grade lignite. The particularly preferred ordinary grade lignite is inexpensive and any residues discharged from the method can be introduced into a biological effluent treatment plant. The concentration of the reducing agent relative to the volume of the wastewater preferably amounts to 1 to 200 g/L, particularly preferably to 5 to 50 g/L.

The types of peat, lignite or hard coal preferably used as reducing agent differ with regard to their degree of coalification, which is manifested in the proportion of volatile constituents and declines in the stated sequence. Ordinary grade lignites such as for example woody lignite accordingly comprise, volatile constituents in a proportion of 50-60 wt. % and hard lignite 45-50 wt. %, while the various grades of hard coal have volatile contents of less than 45 wt. %. Volatile contents of greater than 50 wt. % are characteristic of peat and, in contrast with lignite, peat still contains free cellulose (Römpp Chcmielexikon Online 2008, Georg Thieme Verlag, Stuttgart, headwords "Torf" [="peat"] and "Kohle" [="coal"]).

The wastewater obtained from the first stage (pre-reduction) is neutralised and acidified with an excess of acid. Acidification may be performed with a mineral acid, preferably sulfuric acid, but also with an organic acid. Preferably used, organic acids are acetic acid or oxalic acid, which are themselves readily biodegradable. Mixtures of a plurality of acids may also be used for acidification.

After acidification, oxidation with an oxidising agent proceeds in the second stage. This preferably comprises iron-catalysed wet oxidation with oxygen. To this end the acidified waste water stream is combined with a catalyst; preferably with iron(II) sulfate, and introduced into an oxidation reactor, in which the wastewater is treated preferably at 100-250° C., particularly preferably at 160-220° C., for 5 to 180 minutes, preferably for 30 to 60 minutes, with an oxygen-containing gas, preferably with air, particularly preferably with technical grade pure oxygen. A bubble column or a plurality of bubble columns connected in parallel or series are preferably used as the oxidation reactor.

The wastewater treated by the method according to the invention has had its content of nitroaromatics, nitrohydroxyaromatics and nitrite reduced to such an extent that it can be directly discharged into appropriate effluent treatment plants for biological purification.

EXAMPLES

The wastewater used for the following Examples was of the type as may be obtained in the production of nitroaromatics, for example in the production of nitrobenzene. This wastewater contains no nitroaromatics, but it does contain a plurality of nitrohydroxyaromatics, which, in this specific case, without exception belong to the group of nitrophenols, the chemical names of which are abbreviated as follows:

2-NP: 2-nitrophenol
4-NP: 4-nitrophenol
2,4-DNP: 2,4-dinitrophenol
2,6-DNP: 2,6-dinitrophenol
2,4,6-TNP: 2,4,6-trinitrophenol, common name: picric acid The content of nitrophenols in the wastewater was determined by HPLC analysis. One method suitable for this purpose is described for example by Belloli et al. (Belloli, R.; Barlette B.; Bolzacchini, E.: Meinardi, S.; Orlandi, M.; Rindone, B. "Determination of toxic nitrophenols in the atmosphere by high-performance liquid chromatography". Journal of Chromatography A, 846 (1999) 277-281).

Comparative Example 1

Wet Oxidation in an Alkaline Environment without Pre-reduction

4 L of wastewater from the production of nitroaromatics, which was strongly alkaline, were placed in a laboratory stirred vessel and progressively heated to 200° C. Oxygen was also added up to a total pressure of 20 bar. After 3 hours, the wastewater was cooled and the concentration of the nitroaromatics determined. As Table 1 shows, wet oxidation without pre-reduction only managed to achieve 62% degradation of the nitrophenols.

TABLE 1

|  | 2-NP mg/kg | 4-NP mg/kg | 2,4-DNP mg/kg | 2,6-DNP mg/kg | 2,4,6-TNP mg/kg | Total nitrophenols mg/kg |
| --- | --- | --- | --- | --- | --- | --- |
| Wastewater before treatment | 1440 | 106 | 7756 | 1416 | 376 | 11094 |
| Sample after treatment | 367 | 80 | 3011 | 681 | 72 | 4211 |

Comparative Example 2

Wet Oxidation in an Acidic Environment without Pre-reduction

1 L wastewater from the production of nitroaromatics, which was strongly alkaline, was combined in a beaker with sulfuric acid in order to neutralise and acidify it. A white precipitate consisting of solid nitrohydroxyaromatics was produced. Since it could not be ruled out that these solids might present an explosion hazard, wet oxidation was not performed for safety reasons.

Comparative Example 3

Pre-Reduction with Sodium Sulfite (Inorganic) and Wet Oxidation 4.5 L of wastewater from the production of nitroaromatics were combined with 270 g of sodium sulfite, placed in a laboratory stirred vessel and kept at 70° C. for one hour. 4 L of the wastewater treated in this manner were then combined with 67 mL of sulfuric acid and 6 g of iron(II)) sulfate heptahydrate. The temperature was then progressively raised to 200° C. and oxygen added up to a total pressure of 20 bar. After 3 hours, the wastewater was cooled and the concentration of the nitroaromatics determined. As Table 2 shows, all the nitrophenols were eliminated to below the detection limit. Such treatment is uneconomic, however, due to the elevated price of the reducing agent.

TABLE 2

|  | 2-NP mg/kg | 4-NP mg/kg | 2,4-DNP mg/kg | 2,6-DNP mg/kg | 2,4,6-TNP mg/kg | Total nitrophenols mg/kg |
| --- | --- | --- | --- | --- | --- | --- |
| Wastewater before treatment | 1440 | 106 | 7756 | 1416 | 376 | 11094 |
| Sample after treatment | <1 | <1 | <1 | <1 | <1 | <5 |

Comparative Example 4

Pre-Reduction with Iron Chips or Lignite without Wet Oxidation 4 or 5 L of wastewater from the production of nitroaromatics were respectively combined with 200 g of iron chips or 200 g of lignite dust and kept at 200° C. for three hours. The wastewater was then cooled and the concentration of the nitroaromatics determined. Subsequent wet oxidation was not performed. As Table 3 shows, the rate of nitrophenol degradation by the pre-reduction was 64% with iron chips and 86% with lignite.

TABLE 3

|  | 2-NP mg/kg | 4-NP mg/kg | 2,4-DNP mg/kg | 2,6-DNP mg/kg | 2,4,6-TNP mg/kg | Total nitrophenols mg/kg |
| --- | --- | --- | --- | --- | --- | --- |
| Wastewater before treatment | 1074 | 104 | 5350 | 1382 | 512 | 8422 |
| Sample after treatment with iron chips | 117 | 106 | 2677 | 106 | <20 | 3046 |
| Sample after treatment with lignite dust | 135 | 70 | 935 | 27 | <5 | 1172 |

Example 5

According to the Invention: Pre-Reduction with Lignite (Organic) and Wet Oxidation 5 L of wastewater from the production of nitroaromatics were combined with 200 g of lignite dust and kept at 200° C. for three hours. 4 L of the wastewater treated in this manner were then combined with 51 mL of sulfuric acid and 6 g of iron(II)) sulfate heptahydrate. The temperature was then progressively raised to 200° C. and oxygen added up to a total pressure of 20 bar. After 3 hours, the wastewater was cooled and the concentration of the nitrophenols determined. As Table 4 shows, all the nitrophenols were eliminated to below the detection limit.

TABLE 4

|  | 2-NP mg/kg | 4-NP mg/kg | 2,4-DNP mg/kg | 2,6-DNP mg/kg | 2,4,6-TNP mg/kg | Total nitrophenols mg/kg |
|---|---|---|---|---|---|---|
| Wastewater before treatment | 1074 | 104 | 5350 | 1382 | 512 | 8422 |
| Sample after treatment | <5 | <5 | <5 | <5 | <5 | <25 |

Example 6

According to the Invention: Elimination of Nitrite

5 L of wastewater from the production of nitroaromatics were combined with 50 g of lignite dust and kept at 180° C. for three hours. A sample was then taken and the concentration of the nitrogen species determined. 3 L of the wastewater treated in this manner were then combined with sulfuric acid and 4.5 g of iron(II) sulfate heptahydrate. The temperature was then progressively raised to 200° C. and oxygen added up to a total pressure of 20 bar. After 2 hours, the wastewater was cooled and the concentration of the nitrogen species determined. As table 5 shows, nitrite was completely removed and the nitrogen species predominantly converted into ammonium.

TABLE 5

|  | N (total) mg/l | $NO_3^-$—N mg/l | $NO_2^-$—N mg/l | $NH_4^+$—N mg/l |
|---|---|---|---|---|
| Wastewater before treatment | 1910 | <1 | 290 | 16 |
| Sample after reduction with lignite | 1690 | <1 | 284 | 486 |
| Sample after oxidation with oxygen | 1310 | 78 | <1 | 1678 |

The invention claimed is:

1. A method for treating alkaline wastewater containing nitroarornatics and/or nitrohydroxyaromatics, comprising, in a first stage combining the alkaline wastewater with an organic reducing agent which is non-salt-forming in the wastewater, said organic reducing agent being selected from the group consisting of lignite and hard coal and treating the alkaline wastewater under reducing conditions, wherein the alkaline wastewater is heated to a temperature range of from 80 to 200° C. and maintained in said temperature range for a residence time of from 5 minutes to 5 hours to produce a reduced wastewater and, in a second stage, acidifying and oxidising the reduced wastewater obtained from the first stage with an oxidising agent.

2. A method according to claim 1, characterised in that oxygen is used as the oxidising agent.

3. A method according to claim 1, characterised in that the second stage is performed in a reactor, into which acid is directly introduced and in which the oxidation is performed 4. A method according to claim 1, characterised in that the wastewater containing nitroaromatics and/or nitrohydroxyaromatics originates from the production of nitrobenzene or dinitrotoluene 5. The method of claim 1, wherein the alkaline wastewater is heated to a temperature range of from 120 to 200° C.

6. The method of claim 1, wherein the alkaline wastewater is heated to a temperature range of from 180 to 200° C.

* * * * *